Sept. 22, 1959  R. L. SOLNICK ET AL  2,904,958
SPARK AND FLAME ARRESTER
Filed Oct. 19, 1956

ROBERT L. SOLNICK
RAY C. SOLLARS
INVENTORS

BY *H. Calvin White*

ATTORNEY

2,904,958
Patented Sept. 22, 1959

2,904,958
SPARK AND FLAME ARRESTER

Robert L. Solnick, Whittier, and Ray C. Sollars, Los Angeles, Calif., assignors to The Fluor Corporation, Ltd., Los Angeles, Calif., a corporation of California Application October 19, 1956, Serial No. 617,080

4 Claims. (Cl. 60—30)

This invention has to do with improved exhaust gas cooling and spark arresting apparatus for use in conjunction with internal combustion engines having air-cooled radiators in their water cooling systems. More particularly, the invention is directed to novel spark arresting and exhaust gas cooling equipment used in direct association with an engine radiator in such manner as to take advantage of the fan-displaced air flow through the radiator to cool the exhaust gases before their discharge, and then to dilute the discharge gases by direct admixture with the radiator cooling air.

Structurally contemplated, the invention has for its general object to provide for mounting directly at the front of the radiator a gas cooling and spark arrester unit which includes a conduit, which in effect may be an extended or terminal portion of the exhaust pipe, in association with which is a trap for removing hot carbonaceous particles, and beyond the carbon trap is a gas outlet which preferably is specially designed to effect such distribution of the gas as to assure complete mixing with the relatively cool air from the engine cooling system.

The radiator-mounted cooling unit preferably accommodates a terminal portion of the exhaust pipe so extended (as by giving it a U-shape) in the direct path of the air being discharged through the radiator, as to promote cooling of the exhaust gases to a degree well below the temperature of incandescence of carbon particles, and assuring by reason of the location and distributing function of the gas outlet, intimate and hot particle quenching of the admixture with the cooler air stream. As indicated, the possibility of final emission of any spark particles is further precluded by incorporation of the carbon trap in the system, and assuring displacement of the bulk of solid particles from the gas stream into the trap.

All the features and objects of the invention, as well as the details of a preferred, though typical, embodiment will be more fully understood from the following detailed description of the accompanying drawing, in which.

Figure 1:
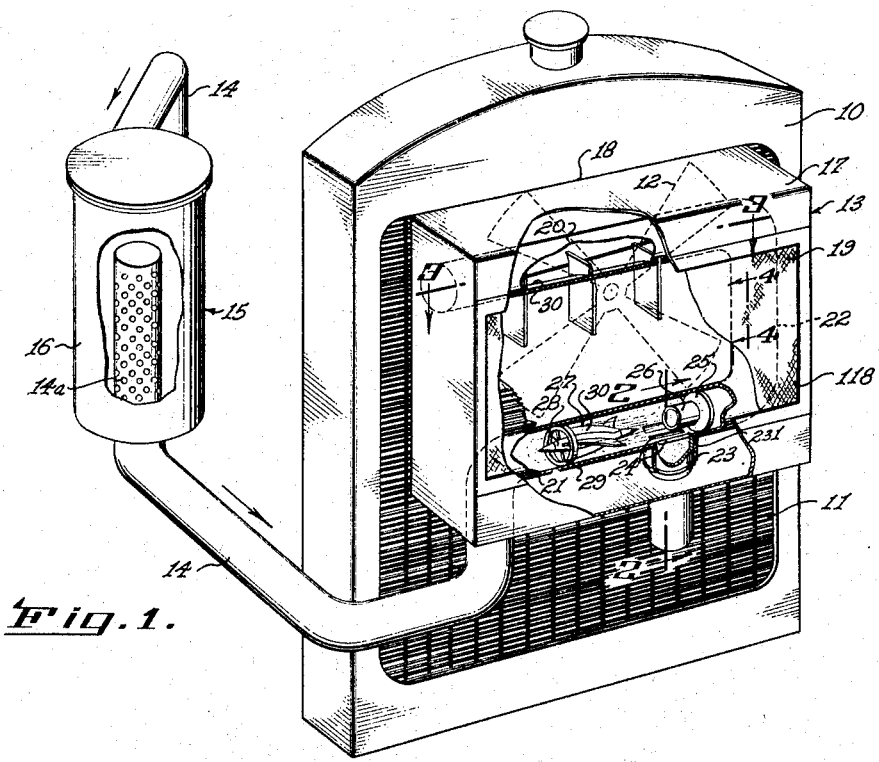
Fig. 1 is a view showing the exhaust gas cooling and spark arrester unit mounted at the front of a radiator, and in association with the exhaust pipe and muffler running from the engine.
Figure 2:
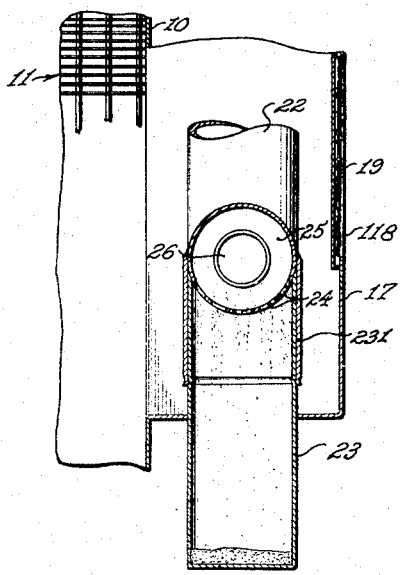
Fig. 2 is a fragmentary enlarged section taken on line 2—2 of Fig. 1.

Considered generally, the system as a whole comprises an engine radiator 10 which includes in its central area the usual finned tubes generally indicated at 11, and through which air is displaced from the engine, not shown, by the conventionally illustrated fan 12 at the rear of the radiator. The gas cooling and spark arrester unit generally indicated at 13 is mounted on the radiator and directly at the front of its air passing area 11, to receive hot exhaust gases being discharged from the engine through pipe 14 and muffler 15. It will be understood that the muffler 15 is not in itself a direct or essential part of the invention although generally to be used in conjunction with the spark arresting unit 13, and that the muffler may be of any suitable form and construction. Typically it is shown to include a shell 16 receiving the exhaust gases which leave through the internal perforated portion 14a of the exhaust pipe.

Figure 4:
Fig. 4 is a fragmentary enlarged section on line 4—4 of Fig. 1.

The unit 13 is shown to comprise a box-like housing 17 which may be supported at 18 on the radiator, the housing having an enlarged air inlet opening next the radiator and a reduced size air outlet opening 118 of rectangular shape, which may or may not be closed by a substantial thickness, say in the order of 1 inch, of metallic foraminate material such as layers of screen 19 (see Fig. 4), through which flows the fan-displaced air stream. The housing contains above, below and at one side of the opening 18, a terminal and essentially U-shaped portion of the exhaust pipe in the form of upper and lower horizontal runs 20 and 21 interconnected by the extent 22.

Communicating with the lower run 21 through an opening in its bottom, is a carbon pot or trap 23 into which carbon particles are displaced through slots 24 by cyclonic movement of the gas stream just ahead of a disc 25 and reduction tube or nipple 26. The trap 23 is removable from within its supporting sleeve 231, for cleaning out of accumulated carbon particles. High velocity swirling movement is given the gas stream just in advance of the slots 24 by a suitable vane arrangement, generally indicated at 27 and comprising typically an air foil 28 supported openly within ring 29 and carrying vanes 30 which impart cyclonic movement to the gas stream at sufficiently high velocity to assure displacement of the bulk of carbon particles into the trap 23.

Figure 3:
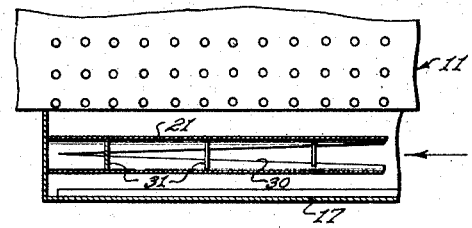
Fig. 3 is a fragmentary section on line 3—3 of Fig. 1.

Leaving tube 26, the exhaust gas stream passes upwardly through portion 22 of the pipe into the upper run 20 which functions essentially as a distributor by reason of the formation in its body of an elongated outlet 30, see Fig. 3, so shaped and extended as to assure progressive and generally uniform discharge and distribution of the exhaust gases into the air stream. As illustrated, the outlet 30 is progressively tapered in the direction of exhaust gas flow throughout a length corresponding to at least a major portion of the width of the air stream flowing through the unit, portions of the gas stream being deflected at spaced intervals downwardly through the tapered outlet slot, by baffles 31 projecting upwardly into the pipe at progressively increasing distances in the direction of the gas flow, and depending from the pipe as shown in Fig. 1. If desired, the total length of the outlet slot 30 may be increased by extending the slot into the riser 22.

As will be apparent from the foregoing description of the apparatus, cooling of the exhaust gas stream by the fan-displaced air, commences within the lower run 21 of the pipe, simultaneously with the removal of carbon particles into the trap 23. The gases are further cooled in flowing to the outlet 30, and finally are quenched in being discharged openly and in uniform admixture with the air stream flowing out from the radiator through the housing 13. The degree of quenching and cooling also assures the arresting of any flame that otherwise might tend to escape through the outlet 30. The layer of metallic mesh 19 precludes the possibility of flame passage through it by reason of fact that the mass of metal is relatively cool and will quickly extinguish any flame, as well as glowing carbon particles, that might reach the screen.

We claim:
1. A spark arrester positioned operatively at the front side of an internal combustion engine radiator air cooled by a fan at the rear side of the radiator, said arrester comprising an engine exhaust pipe having an elongated U-shaped looping terminal portion with upper and lower essentially horizontal runs, means mounting said portion at the front side of the radiator in the path of the fan-displaced airflow therethrough, said means including a housing extending about the pipe loop and having an enlarged air inlet opening and a reduced air outlet opening for passing the airflow over the pipe loop and for increasing the velocity of the airflow through the housing, said upper pipe run having an outlet at the inside of the pipe loop through which exhaust gases are discharged downwardly into said increased velocity airflow, and a carbon trap communicating with the lower pipe run.

2. An arrester as defined by claim 1, including means for centrifugally displacing carbon particles from the exhaust gas into said trap.

3. An arrester as defined by claim 1, in which said pipe outlet is formed by an elongated tapered slot in the exhaust pipe, and spaced baffles are positioned in said slot.

4. An arrester as defined by claim 1, including a foraminate metallic material spanning said housing outlet opening.

References Cited in the file of this patent

UNITED STATES PATENTS

| | | |
|---|---|---|
| 851,494 | Chalfant | Apr. 23, 1907 |
| 862,250 | Herman | Aug. 6, 1907 |
| 917,232 | Worthington | Apr. 6, 1909 |
| 1,032,536 | Gerli | July 16, 1912 |
| 1,244,442 | Frazer | Oct. 23, 1917 |
| 1,421,432 | Embanks | July 4, 1922 |
| 1,465,904 | Herdle | Aug. 21, 1923 |
| 1,525,249 | Mastenbrook | Feb. 3, 1925 |
| 1,716,480 | Bilski | June 11, 1929 |
| 1,751,739 | Jacobsen | Mar. 25, 1930 |
| 1,794,276 | Bowes | Feb. 24, 1931 |
| 1,877,296 | Goldberg | Sept. 13, 1932 |
| 2,112,534 | Keen | Mar. 29, 1938 |
| 2,197,854 | Eckert | Apr. 23, 1940 |
| 2,659,450 | Baird | Nov. 17, 1953 |
| 2,673,446 | De Salardi | Mar. 30, 1954 |
| 2,708,920 | Pasturczek | Mar. 24, 1954 |

FOREIGN PATENTS

| | | |
|---|---|---|
| 572,155 | France | Feb. 15, 1924 |